US009516604B2

(12) United States Patent
Zhao et al.

(10) Patent No.: US 9,516,604 B2
(45) Date of Patent: Dec. 6, 2016

(54) METHOD OF TRANSMITTING DATA BETWEEN A PLURALITY OF BASE STATIONS AND A PLURALITY OF MOBILE STATIONS

(75) Inventors: Jian Zhao, Singapore (SG); Zhongding Lei, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 238 days.

(21) Appl. No.: 14/239,304

(22) PCT Filed: Aug. 21, 2012

(86) PCT No.: PCT/SG2012/000293
§ 371 (c)(1),
(2), (4) Date: Jun. 16, 2014

(87) PCT Pub. No.: WO2013/025174
PCT Pub. Date: Feb. 21, 2013

(65) Prior Publication Data
US 2014/0302884 A1   Oct. 9, 2014

(30) Foreign Application Priority Data
Aug. 18, 2011  (SG) .............................. 201105966-4

(51) Int. Cl.
*H04B 7/00* (2006.01)
*H04W 52/24* (2009.01)
(Continued)

(52) U.S. Cl.
CPC .......... *H04W 52/243* (2013.01); *H04L 5/0035* (2013.01); *H04W 52/346* (2013.01);
(Continued)

(58) Field of Classification Search
CPC .. H04W 52/243; H04W 52/346; H04W 52/40; H04W 72/0473; H04B 7/024; H04L H04L 5/0035
See application file for complete search history.

(56) References Cited

U.S. PATENT DOCUMENTS 5,410,737 A * 4/1995 Jones ....................... H04B 1/38
455/454
5,963,865 A    10/1999 Desgagne et al.
(Continued)

FOREIGN PATENT DOCUMENTS

WO    2011051914 A1   5/2011

OTHER PUBLICATIONS

Written Opinion of the International Searching Authority for International Application No. PCT/SG2012/00293 dated Oct. 2, 2012, pp. 1-4.

*Primary Examiner* — Mohammed Rachedine
(74) *Attorney, Agent, or Firm* — K. David Crockett, Esq.; Niky Economy Syrengelas, Esq.; Crockett & Crockett, PC

(57) ABSTRACT

A method of transmitting data between a plurality of base stations and a plurality of mobile stations is provided. The method includes ranking data links between the plurality of base stations and the plurality of mobile stations according to a quality criterion, and selecting a subset of data links for transmitting the data between the plurality of base stations and the plurality of mobile stations such that a predetermined requirement is satisfied. Selecting the subset of data links may include iteratively assigning a predetermined value to power of the data link having the lowest ranking and determining if the predetermined requirement is satisfied, until the predetermined requirement is no longer satisfied. The remaining data links may then be selected for transmitting the data between the plurality of base stations and the plurality of mobile stations.

8 Claims, 11 Drawing Sheets

(51) Int. Cl.
*H04W 52/34* (2009.01)
*H04L 5/00* (2006.01)
H04W 72/04 (2009.01)
H04W 52/40 (2009.01)
H04B 7/02 (2006.01)

(52) U.S. Cl.
CPC ............ *H04B 7/024* (2013.01); *H04W 52/40* (2013.01); *H04W 72/0473* (2013.01)

(56) References Cited

U.S. PATENT DOCUMENTS

| | | | |
|---|---|---|---|
| 8,315,207 B2* | 11/2012 | Borran | H04W 48/20 370/252 |
| 2009/0221287 A1* | 9/2009 | Balasubramanian | H04W 48/16 455/434 |
| 2012/0039273 A1* | 2/2012 | Nam | H04L 5/0005 370/329 |

* cited by examiner (a) SLR-based clustering method (b) Channel strength-based clustering method (a) SLR-based clustering method (b) Channel strength-based clustering method

METHOD OF TRANSMITTING DATA BETWEEN A PLURALITY OF BASE STATIONS AND A PLURALITY OF MOBILE STATIONS

CROSS REFERENCE TO RELATED APPLICATIONS

The present application is a U.S. National Stage Application under 35 U.S.C. §371 of International Application No. PCT/SG2012/000293, filed on 21 Aug. 2012, the complete disclosure of which is incorporated herein by reference. This application claims the benefit of priority of Singapore patent application No. 201105966-4, filed 18 Aug. 2011, the content of it being hereby incorporated by reference in its entirety for all purposes.

TECHNICAL FIELD

Various embodiments relate generally to a method of transmitting data between a plurality of base stations and a plurality of mobile stations.

BACKGROUND

Generally, cellular wireless communication systems are interference-limited. That is, different base stations (BSs) generate out-of-cell interference to neighboring mobile stations (MSs) using the same frequency channels. In addition, the fourth generation (4G) wireless communication systems, such as Long Term Evolution (LTE) Advanced, intend to achieve the frequency reuse factor of 1. Thus, interference mitigation techniques may be required for wireless communication.

Coordinated Multipoint (CoMP) transmission is envisioned to be an important component technology in third generation partnership project (3GPP) LTE-Advanced. In CoMP, inter-cell interference can be mitigated or eliminated by proper beamforming design. There are two major techniques in CoMP: joint processing and coordinated beamforming. In coordinated beamforming, the data stream for each mobile station (MS) is transmitted from a single base station (BS) node, and the beamformer design for each BS is coordinated among the cooperating BSs. Joint processing can achieve higher system throughput but may require the transmit data for different users to be available at each cooperating BS. In joint processing, selection of the base station cooperation sets and allocation of the user data can be crucial for the system performance.

The beamforming vector design has previously been used in a multicellular environment subject to Per-BS power constraint. In such a scenario, each BS is responsible for transmission to its own MSs, and no MS data is exchanged between different cells. Further, a zero-forcing scheme involving multiple BSs has been considered. For the zero-forcing scheme, the data for all the MSs in the cooperating cells are distributed among all the cooperating BSs. In addition, heuristic clustering methods for BS cooperation based on the distance between the BSs and MSs have also been used.

SUMMARY

According to one embodiment, a method of transmitting data between a plurality of base stations and a plurality of mobile stations is provided. The method includes ranking data links between the plurality of base stations and the plurality of mobile stations according to a quality criterion, and selecting a subset of data links for transmitting the data between the plurality of base stations and the plurality of mobile stations such that a predetermined requirement is satisfied, wherein the selected subset includes data links having rankings including the highest ranking or both the highest ranking and one or more rankings selected in a descending order from the highest ranking. Selecting the subset of data links may include assigning a predetermined value to power of the data link having the lowest ranking of the parameter and determining if the predetermined requirement is satisfied. If it is determined that the predetermined requirement is satisfied, selecting the subset of data links may include assigning the predetermined value to power of the data link having the next lowest ranking and further determining if the predetermined requirement is satisfied. If it is determined that the predetermined requirement is not satisfied, selecting the subset of data links may include selecting the remaining data links for transmitting the data between the plurality of base stations and the plurality of mobile stations.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DETAILED DESCRIPTION

Embodiments of a method of transmitting data between a plurality of base stations and a plurality of mobile stations will be described in detail below with reference to the accompanying figures. It will be appreciated that the embodiments described below can be modified in various aspects without changing the essence of the invention.

Figure 1:
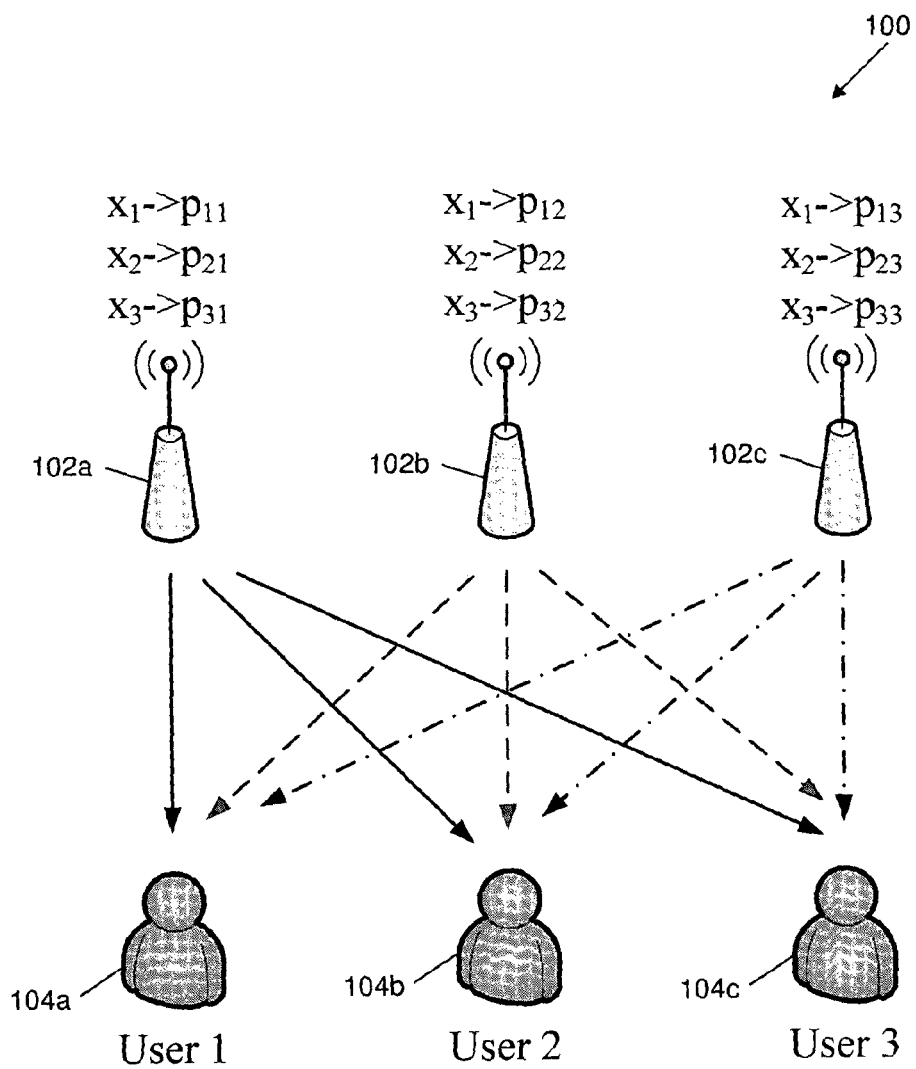
FIG. 1 shows a drawing of an arrangement of base stations and mobile stations.

FIG. 1 shows a drawing of an arrangement 100 of base stations (BSs) 102 and mobile stations (MSs) 104. The arrangement 100 has a plurality of BSs 102 and a plurality of MSs. The plurality of BSs 102 cooperate to transmit to the plurality of MSs at the same time and using the same frequency channel. For illustration purposes, three base stations (e.g. a first base station 102a, a second base station 102b, a third base station 102c) and three mobile stations (e.g. a first mobile station 104a, a second mobile station 104b, a third mobile station 104c) are shown in FIG. 1.

In FIG. 1, $x_i$ denotes the data symbol for the ith MS, where $i \in 1, \ldots, K$ and K is the total number of MSs. $p_{ij}$ denotes the allocated power at the jth BS for the ith MS, where $j \in 1, \ldots, B$ and B is the total number of BSs. When $p_{ij}=0$, it means that the data for the ith MS is not allocated on the jth BS. The power allocation $p_{ij}$ can be written into a (K×B) matrix P, where the {i, j}-th element of the matrix P is $p_{ij}$.

In order to use the minimum number of BSs to cooperate to transmit to the MSs, it is desirable to force as many $p_{ij}$ to zero as possible (subject to certain signal to interference-plus-noise ratio (SINR) and power constraints). This corresponds to maximizing the sparsity of the matrix P, subject to certain SINR and power constraints. It can be expressed using the following optimization problem.

$$\text{maximize} \quad \|P\|_0 \quad (1)$$

$$\text{subject to} \quad SINR_i \geq \gamma_i, \forall i \in \{1, \ldots, K\}$$

$$\sum_i p_{ij} \leq P_j, \forall j \in \{1, \ldots, B\}$$

where $\|\cdot\|_0$ denotes the $l_0$-"norm", i.e., sparsity, $SINR_i$ is the SINR of the ith mobile station, $\gamma_i$ is the SINR requirement of the ith mobile station, $p_{ij}$ is the power allocation for a data link between the jth base station and the ith mobile station, and $P_j$ is the total transmit power constraint for the jth base station.

The first inequality $SINR_i \geq \gamma_i$ denotes the SINR constraint, and the second inequality $$\sum_i p_{ij} \leq P_j$$

denotes the Per-BS power constraint.
Furthermore, $$SINR_i = \frac{\left|\sum_j \vec{h}_{ij}^H \sqrt{p_{ij}} \vec{w}_{ij}\right|^2}{\sigma_i^2 + \sum_{k \neq i}\left|\sum_j \vec{h}_{ij}^H \sqrt{p_{kj}} \vec{w}_{kj}\right|^2} \quad (2)$$

where $\vec{w}_{ij}$ denotes the beamforming vector (normalized to 1) for the data stream/data link between the ith MS and the jth BS, $p_{ij}$ is the power allocation for the data link between the jth base station and the ith mobile station, $\sigma_i^2$ is the noise variance at the ith MS, $\vec{h}_{ij}^H$ is the channel from the jth BS to the ith MS, $\vec{w}_{kj}$ is the beamforming vector (normalized to 1) for the data stream of kth MS on the jth BS.

However, equation (1) is a nonconvex optimization problem. Such problems can be solved by exhaustive search. However, the complexity of exhaustive search is exponential and is not practical in real-world applications.

Figure 2:
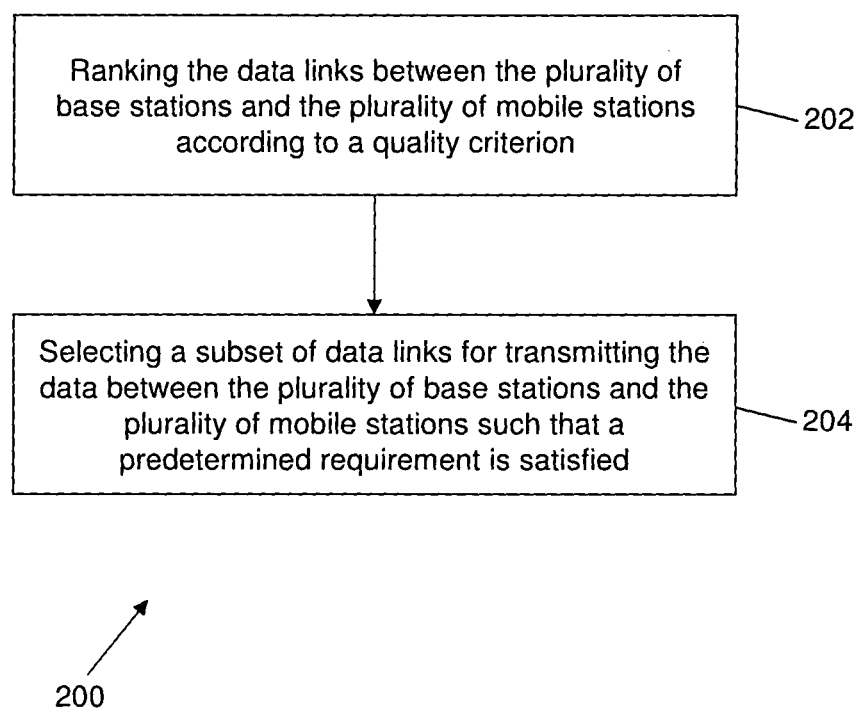
FIG. 2 shows a flowchart of a method of transmitting data between a plurality of base stations and a plurality of mobile stations according to one embodiment.

FIG. 2 shows a flowchart 200 of a method of transmitting data between a plurality of base stations and a plurality of mobile stations according to one embodiment. At 202, data links between the plurality of base stations and the plurality of mobile stations are ranked according to a quality criterion. At 204, a subset of data links for transmitting the data between the plurality of base stations and the plurality of mobile stations is selected such that a predetermined requirement is satisfied.

In one embodiment, the selected subset of data links may include data links having rankings including the highest ranking.

In another embodiment, the selected subset of data links may include data links having rankings including both the highest ranking and one or more rankings selected in a descending order from the highest ranking. For example, the selected subset may include data links having the highest ranking and the second highest ranking. The selected subset may also include data links having the highest ranking, the second highest ranking, the third highest ranking and so on.

Selecting the subset of data links may include assigning a predetermined value to power of the data link having the lowest ranking of the parameter and determining if the predetermined requirement is satisfied. If it is determined that the predetermined requirement is satisfied, selecting the subset of data links may further include assigning the predetermined value to power of the data link having the next lowest ranking and further determining if the predetermined requirement is satisfied. The predetermined value may be zero.

If it is determined that the predetermined requirement is not satisfied, selecting the subset of data links may further include selecting the remaining data links for transmitting the data between the plurality of base stations and the plurality of mobile stations.

The predetermined requirement may include a signal to interference-plus-noise ratio constraint requirement. The predetermined requirement may further include a power constraint requirement.

The predetermined requirement is satisfied when the signal to interference-plus-noise ratio of each mobile station is greater than or equal to a predefined signal to interference-plus-noise ratio for the mobile station and when a sum of the power allocated to the data links at each base station is smaller than or equal to a predefined total power constraint at the base station.

Ranking the data links according to a quality criterion may include calculating a value of the quality criterion for each data link; and ranking the data links according to the values of the quality criterion.

In one embodiment, the quality criterion may include a signal-to-leakage ratio of the data link. In another embodiment, the quality criterion may include a channel strength of the data link.

The method may further include determining if the predetermined requirement is satisfied based on information of the data links between the plurality of base stations and the plurality of mobile stations before the data links are ranked according to a quality criterion. The information of the data links between the plurality of base stations and the plurality of mobile stations may include power allocated to each data link. The information of the data links between the plurality of base stations and the plurality of mobile stations may further include a beamforming vector of each data link.

Exemplary methods for transmitting data between a plurality of base stations and a plurality of mobile stations are described in the following.

Figure 3:
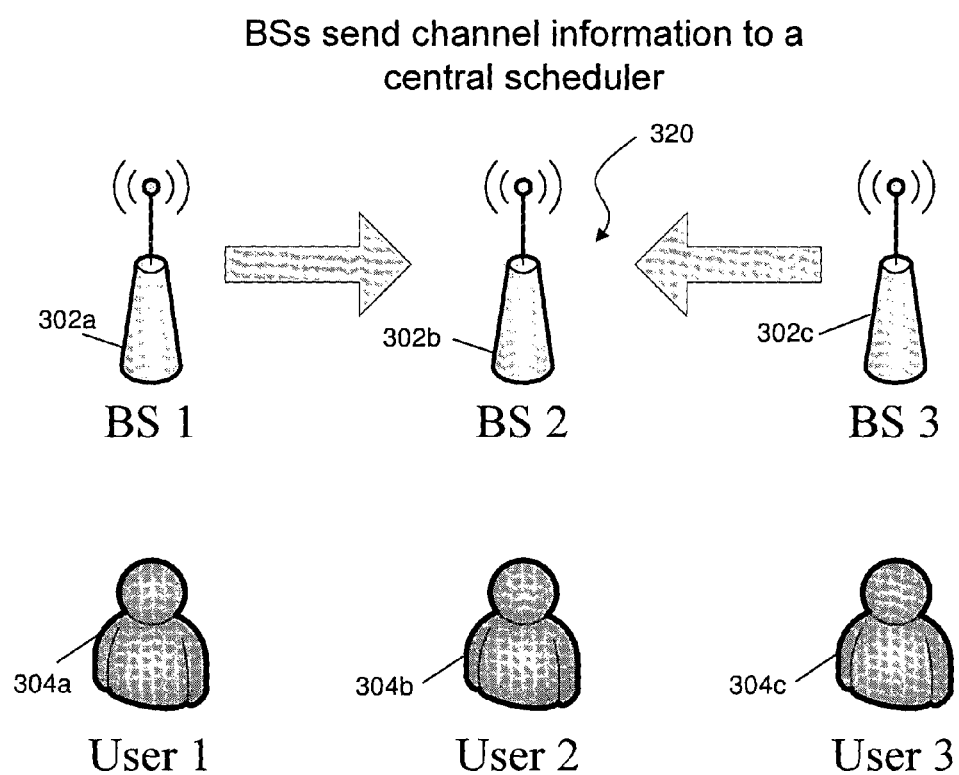
FIG. 3 shows a drawing of an arrangement of base stations and mobile stations according to one embodiment.

One exemplary method may be a clustering method based on the signal-to-leakage ratio (SLR) of the data streams/data links between a plurality of base stations and a plurality of mobile stations. All the cooperating base stations (BSs) 302a, 302b, 302c send the channel state information (CSI) to a central scheduler 320 as illustrated in FIG. 3. The channel state information of each channel between the ith mobile station and the jth base station is represented by the vector $\vec{h}_{ij}^H$. Each base station 302a, 302b, 302c only has the channel state information between itself and the respective mobile stations. In one embodiment, the central scheduler 320 may be the base station 302b. In another embodiment, the central scheduler 320 may be a separate unit.

For simplicity of illustration, only three base stations (BSs) 302a, 302b, 302c and only three mobile stations (MSs) 304a, 304b, 304c are shown in FIG. 3. Different numbers of base stations and mobile stations may be used in other embodiments. Examples of base stations may include but are not limited to LTE Base Station Transceiver or eNode-B.

The central scheduler 320 assumes that all the BSs 302a, 302b, 302c can cooperate. In other words, all the BSs 302a, 302b, 302c are assumed to have the data for all the mobile stations (MSs) 304a, 304b, 304c. In one embodiment, the channel state information may include information of the data links between the plurality of base stations 302a, 302b, 302c and each of the mobile stations 304a, 304b, 304c. The information of the data links may include power allocated to each data link. The information of the data links may further include a beamforming vector of each data link.

The central scheduler 320 solves the following convex optimization problem:

$$\text{minimize} \sum_{i,j} p_{ij} \quad (3)$$

$$\text{subject to} \quad SINR_i \geq \gamma_i, \forall i \in \{1, \ldots, K\}$$

$$\sum_i p_{ij} \leq P_j, \forall j \in \{1, \ldots, B\}$$

where $SINR_i$ is the SINR of the ith mobile station, $\gamma_i$ is the SINR requirement of the ith mobile station, $p_{ij}$ is the power allocation for the data link between the jth base station and the ith mobile station, and $P_j$ is the total transmit power constraint for the jth base station.

If $p_{ij}$ and $\vec{w}_{ij}$ that can satisfy a predetermined requirement can be found, it means that the predetermined requirement can be satisfied by the cooperating BSs. In one embodiment, the predetermined requirement includes a SINR constraint requirement, $SINR_i \geq \gamma_i$. The predetermined requirement further includes a power constraint requirement (e.g. a Per-BS power constraint), $$\sum_i p_{ij} \leq P_j.$$

In one embodiment, the predetermined requirement is satisfied when a signal to interference-plus-noise ratio of each mobile station is greater than or equal to a predefined signal to interference-plus-noise ratio of the mobile station (e.g. SINR constraint requirement) and when a sum of the power allocated to the data links at each base station is smaller than or equal to a predefined total transmit power constraint for the base station (e.g. power constraint requirement).

Then, a quality criterion, i.e. a signal, to leakage ratio (SLR), is calculated for each data link/data stream {i, j}. The data links are ranked according to the signal to leakage ratio. In one embodiment, the data links may be sorted from the lowest value of the signal to leakage ratio to the highest value of the signal to leakage ratio or vice versa.

The signal to leakage ratio (SLR) for each data link/data stream {i, j} is defined as $$SLR_{ij} = \frac{\left|\vec{h}_{ij}^H \sqrt{p_{ij}} \vec{w}_{ij}\right|^2}{\sum_{k \neq i} \left|\vec{h}_{kj}^H \sqrt{p_{ij}} \vec{w}_{ij}\right|^2}. \quad (1)$$

where $\vec{h}_{ij}^H$ is the beamforming vector (normalized to 1) for the data link {i, j}, $p_{ij}$ is the power allocation for the data link {i, j} between the ith mobile station and the jth base station, $\vec{h}_{ij}^H$ is the channel from the jth BS to the ith MS, and $\vec{h}_{kj}^H$ is the channel from the jth BS to the kth MS.

A predetermined value is then assigned to the power $p_{ij}$ of the data link having the lowest ranking (i.e. the lowest value of the SLR). In one embodiment, the predetermined value may be 0. The data link is non-existent when the power of the data link is 0.

The following feasibility problem may be checked using the remaining data links:

$$\text{find} \quad p_{ij}, \vec{w}_{ij} \quad (5)$$

$$\text{subject to} \quad SINR_i \geq \gamma_i, \forall i \in \{1, \ldots, K\}$$

$$\sum_i p_{ij} \leq P_j, \forall j \in \{1, \ldots, B\}$$

The feasibility problem in equation (5) may be checked to determine if the predetermined requirement is still satisfied. If $p_{ij}$ and $\vec{w}_{ij}$ that can satisfy the predetermined requirement can be found, it means that the predetermined requirement can be satisfied. When it is determined that the predetermined requirement is satisfied, the predetermined value is assigned to the power of the data link having the next lowest ranking and it is further determined if the predetermined requirement can still be satisfied.

The steps may be repeated, and within this process of removing data links, $\forall i$, the power $p_{ij}$ of at least one data link must be kept greater than zero. The steps may be repeated until the predetermined requirement is not satisfied.

When the predetermined requirement is not satisfied, the remaining data links are selected for transmitting the data between the plurality of base stations 302a, 302b, 302c and the plurality of mobile stations 304a, 304b, 304c. The remaining data links include the data link which has the predetermined value assigned to its power before the predetermined requirement is found not to be satisfied.

In short, a subset of data links for transmitting the data between the plurality of base stations 302a, 302b, 302c and the plurality of mobile stations 304a, 304b, 304c is selected such that a predetermined requirement is satisfied. The selected subset may include data links having rankings including the highest ranking or both the highest ranking and one or more rankings selected in a descending order from the highest ranking.

Figure 4:
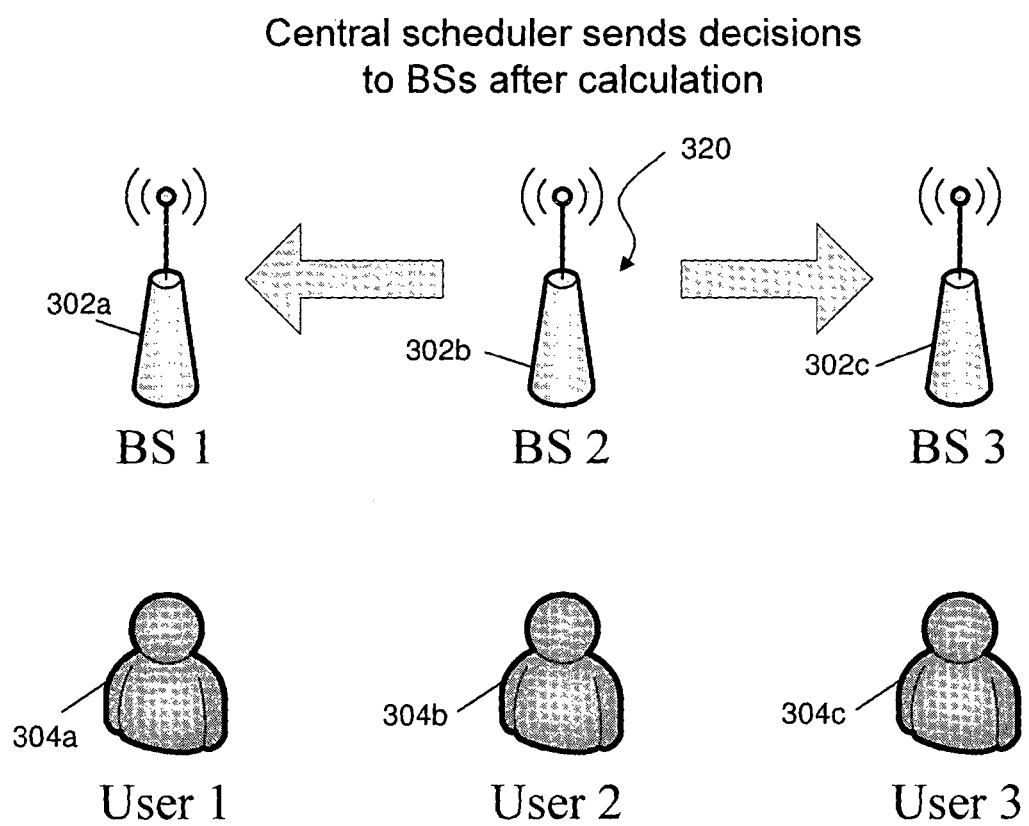
FIG. 4 shows a drawing of an arrangement of base stations and mobile stations according to one embodiment.

After the subset of data links for transmitting the data between the plurality of base stations 302a, 302b, 302c and the plurality of mobile stations 304a, 304b, 304c is selected, the central scheduler 320 then transmits the information regarding the selected data links to the base stations 302a, 302b, 302c as illustrated in FIG. 4.

Figure 5:
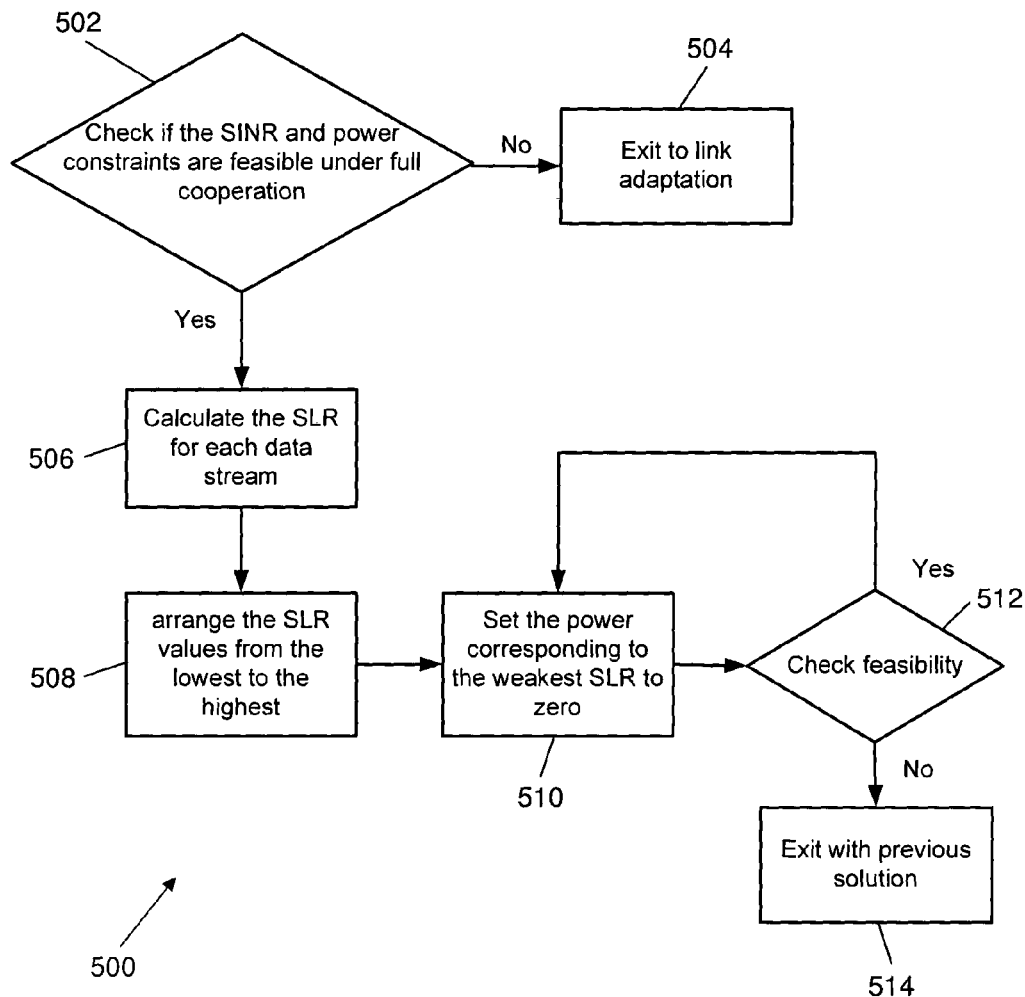
FIG. 5 shows a flowchart of a method of transmitting data between a plurality of base stations and a plurality of mobile stations according to one embodiment.

The above described method is illustrated in a flowchart 500 shown in FIG. 5. At 502, it is checked if the signal to interference-plus-noise ratio constraint requirement and the power constraint requirement are feasible under full cooperation. In other words, it is checked if the predetermined requirement is satisfied when all the base stations cooperate to transmit data to the plurality of mobile stations (i.e. all the base stations have data for all the mobile stations). If the signal to interference-plus-noise ratio constraint requirement and the power constraint requirement are not feasible under full cooperation, link adaptation may be carried out at 504. Link adaptation may be carried out when the cooperative transmission of the plurality of the base stations to the mobile stations cannot meet the desired SINR requirements for the mobile stations. As such, link adaption may be carried out to lower the SINR requirement or to reduce the number of users (e.g. the number of mobile stations).

If the signal to interference-plus-noise ratio constraint requirement and the power constraint requirement are feasible under full cooperation, the signal to leakage ratio for each data stream/data link between the plurality of base stations and the plurality of mobile stations is calculated at 506. At 508, the data streams/data links are arranged according to the signal to leakage ratio values from the lowest to the highest. At 510, the power of the data stream/data link having the lowest signal to leakage ratio value is set to zero. At 512, it is checked if the signal to interference-plus-noise ratio constraint requirement and the power constraint requirement are still feasible.

If the signal to interference-plus-noise ratio constraint requirement and the power constraint requirement are still feasible, the processes at 510 and 512 are repeated until the signal to interference-plus-noise ratio constraint requirement and the power constraint requirement are found to be not feasible. When the signal to interference-plus-noise ratio constraint requirement and the power constraint requirement are not feasible, the remaining data links are selected for transmitting data between the plurality of base stations and the plurality of mobile stations. The selected data links include the data link which has its power set to zero before the signal to interference-plus-noise ratio constraint requirement and the power constraint requirement are found to be not feasible.

Another exemplary method may be a method based on a channel strength of the data links. The channel strength for a $\{i,j\}$-th data link is defined as $\vec{h}_{ij}^H \vec{h}_{ij}$.

All the cooperating base stations (BSs) 302a, 302b, 302c send the channel state information (CSI) to a central scheduler 320 as illustrated in FIG. 3. In one embodiment, the central scheduler 320 may be the base station 302b. In another embodiment, the central scheduler 320 may be a separate unit.

For simplicity of illustration, only three base stations (BSs) 302a, 302b, 302c and only three mobile stations (MSs) 304a, 304b, 304c are shown in FIG. 3. Different number of base stations and mobile stations may be used in other embodiments. Examples of base stations include LTE Base Station Transceiver or eNode-B.

The central scheduler 320 assumes that all the BSs 302a, 302b, 302c can cooperate. In other words, all the BSs 302a, 302b, 302c have all data for the mobile stations (MSs) 304a, 304b, 304c. In one embodiment, the channel state information may include information of the data links between the plurality of base stations 302a, 302b, 302c and the plurality of mobile stations 304a, 304b, 304c. The information of the data links may include power allocated to each data link. The information of the data links may further include a beamforming vector of each data link.

The central scheduler 320 solves the following convex optimization problem:

$$\text{minimize} \sum_{i,j} p_{ij} \qquad (6)$$

$$\text{subject to } SINR_i \geq \gamma_i, \forall\, i \in \{1, \ldots, K\}$$

$$\sum_i p_{ij} \leq P_j, \forall\, j \in \{1, \ldots, B\}$$

where $SINR_i$ is the SINR of the ith mobile station, $\gamma_i$ is the SINR requirement of the ith mobile station, $p_{ij}$ is the power allocation for the data link between the jth base station and the ith mobile station, and $P_j$ is the total transmit power constraint for the jth base station.

If $p_{ij}$ and $\vec{w}_{ij}$ that can satisfy a predetermined requirement can be found, it means that the predetermined requirement can be satisfied by the cooperating BSs. In one embodiment, the predetermined requirement includes a SINR constraint requirement, $SINR_i \geq \gamma_i$. The predetermined requirement further includes a power constraint requirement (e.g. a Per-BS power constraint), $$\sum_i p_{ij} \leq P_j.$$

In one embodiment, the predetermined requirement is satisfied when a signal to interference-plus-noise ratio of each mobile station is greater than or equal to a predefined signal to interference-plus-noise ratio of the mobile station (e.g. SINR constraint requirement) and when a sum of the power allocated to the data links at each base station is smaller than or equal to a predefined total power constraint for the base station (e.g. power constraint requirement).

Then, a quality criterion, i.e. a channel strength, is calculated for each data link/data stream $\{i, j\}$. The data links are ranked according to the channel strength. The data links are ranked according to according to the values of the channel strength. In one embodiment, the data links may be sorted from the lowest value of the channel strength to the highest value of the channel strength or vice versa.

A predetermined value is then assigned to the power $p_{ij}$ of the data link having the lowest ranking (i.e. the lowest channel strength). In one embodiment, the predetermined value may be 0. The data link is non-existent when the power of the data link is 0.

The following feasibility problem may be checked using the remaining data links:

$$\text{find} \quad p_{ij}, \vec{w}_{ij} \quad (7)$$
$$\text{subject to} \quad SINR_i \geq \gamma_i, \forall i \in \{1, \ldots, K\}$$
$$\sum_i p_{ij} \leq P_j, \forall j \in \{1, \ldots, B\}$$

The feasibility problem in equation (7) may be checked to determine if the predetermined requirement is still satisfied. If $p_{ij}$ and $\vec{w}_{ij}$ that can satisfy the predetermined requirement can be found, it means that the predetermined requirement can be satisfied. When it is determined that the predetermined requirement is satisfied, the predetermined value is assigned to power of the data link having the next lowest ranking and it is further determined if the predetermined requirement can still be satisfied.

The steps may be repeated, and within this process of removing data links, $\forall i$, at least one $p_{ij}$ must be kept greater than zero. The steps may be repeated until the predetermined requirement is not satisfied.

When the predetermined requirement is not satisfied, the remaining data links are selected for transmitting the data between the plurality of base stations 302a, 302b, 302c and the plurality of mobile stations 304a, 304b, 304c. The remaining data links include the data link which has the predetermined value assigned to its power before the predetermined requirement is found not to be satisfied.

In short, a subset of data links for transmitting the data between the plurality of base stations 302a, 302b, 302c and the plurality of mobile stations 304a, 304b, 304c is selected such that a predetermined requirement is satisfied. The selected subset may include data links having rankings including the highest ranking or both the highest ranking and one or more rankings selected in a descending order from the highest ranking.

After the subset of data links for transmitting the data between the plurality of base stations 302a, 302b, 302c and the plurality of mobile stations 304a, 304b, 304c is selected, the central scheduler 320 then transmits the information regarding the selected data links to the base stations 302a, 302b, 302c as illustrated in FIG. 4.

Figure 6:
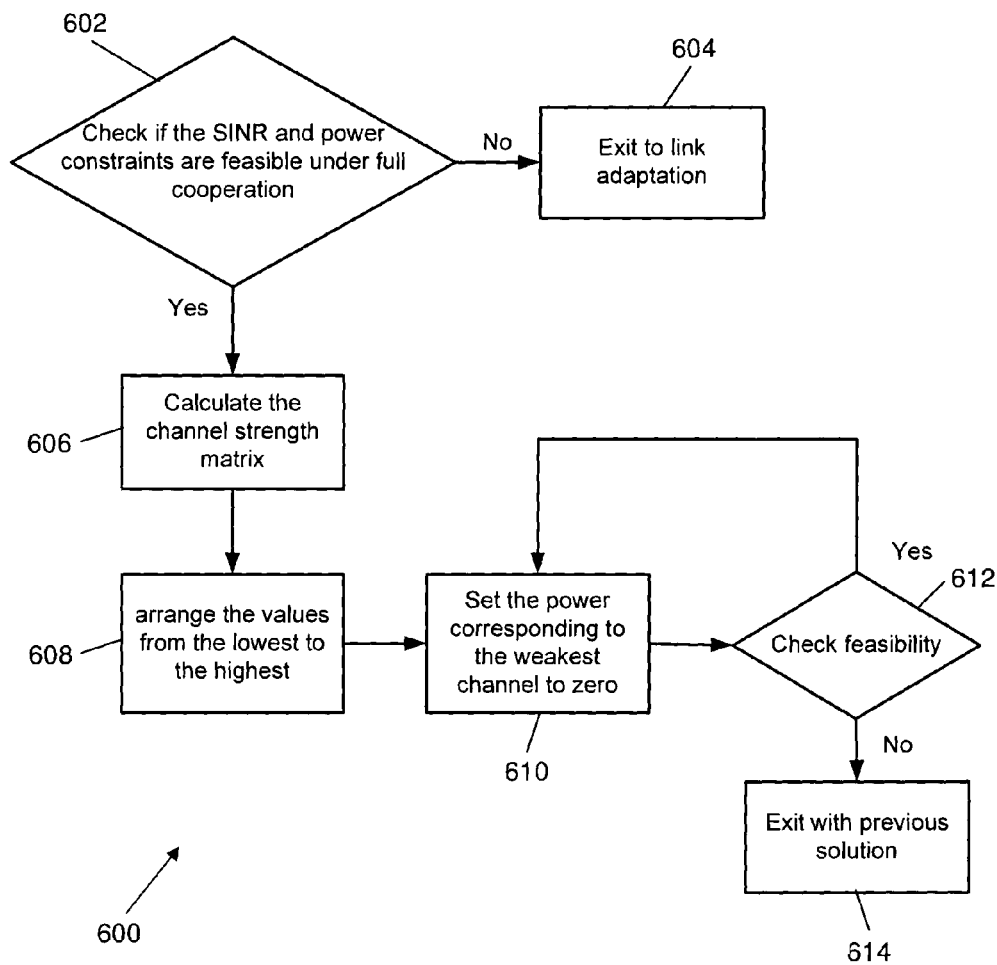
FIG. 6 shows a flowchart of a method of transmitting data between a plurality of base stations and a plurality of mobile stations according to one embodiment.

The above described method is illustrated in a flowchart 600 shown in FIG. 6. At 602, it is checked if the signal to interference-plus-noise ratio constraint requirement and the power constraint requirement are feasible under full cooperation. In other words, it is checked if the predetermined requirement is satisfied when all the base stations cooperate to transmit data to the plurality of mobile stations (i.e. all the base stations have data for all the mobile stations). If the signal to interference-plus-noise ratio constraint requirement and the power constraint requirement are not feasible under full cooperation, link adaptation may be carried out at 604. Link adaptation may be carried out when the cooperative transmission of the plurality of the base stations to the mobile stations cannot meet the desired SINR requirements for the mobile stations. As such, link adaption may be carried out to lower the SINR requirement or to reduce the number of users (e.g. the number of mobile stations).

If the signal to interference-plus-noise ratio constraint requirement and the power constraint requirement are feasible under full cooperation, the channel strength for each data stream/data link between the plurality of base stations and the plurality of mobile stations is calculated at 606. At 608, the data streams/data links are arranged according to the channel strength values from the lowest to the highest. At 610, the power of the data stream/data link having the lowest channel strength value is set to zero. At 612, it is checked if the signal to interference-plus-noise ratio constraint requirement and the power constraint requirement are still feasible.

If the signal to interference-plus-noise ratio constraint requirement and the power constraint requirement are still feasible, the processes at 610 and 612 are repeated until the signal to interference-plus-noise ratio constraint requirement and the power constraint requirement are found to be not feasible. When the signal to interference-plus-noise ratio constraint requirement and the power constraint requirement are not feasible, the remaining data links are selected for transmitting data between the plurality of base stations and the plurality of mobile stations. The selected data links include the data link which has its power set to zero before the signal to interference-plus-noise ratio constraint requirement and the power constraint requirement are found to be not feasible.

The process of the above described methods can be carried out for one mobile station or a plurality of mobile stations. In the event that the process is carried out for a plurality of mobile stations, the process can be carried out for all the mobile stations 304a, 304b, 304c at the same time. For example, the process 510 to 512 or the process 610 to 612 is carried out for all the mobile stations 304a, 304b, 304c at the same time based on the links between the base stations 302a, 302b, 302c and the mobile stations 304a, 304b, 304c. One link refers to transmission/channel between one base station and one mobile station. Therefore, there are a maximum number of nine links for the exemplary system as illustrated in FIG. 3.

By determining the subset of data links for transmitting data to the respective mobile stations, the cooperating base stations for transmitting data to all the mobile stations may also be determined.

The two exemplary methods described above may be low complexity methods for minimizing the number of cooperating BSs subject to certain SINR and power constraints. The methods may be heuristic, but work well in practice.

For base stations with multiple antennas, the methods described above decide both the beamforming vectors and the power allocation at the same time.

In one embodiment, an Information Exchange Mechanism is described as follows. A set of base stations feedback the channel state information (CSI) to a central scheduler. The central scheduler checks if the QoS requirements can be satisfied if the data for all the users are available on all the base stations. The central scheduler removes one of the data streams based on certain predetermined criterion and re-check if the QoS requirement can still be satisfied. The central scheduler repeats the process of removing one of the data streams based on certain predetermined criterion and re-checking if the QoS requirement can still be satisfied until it is infeasible to satisfy the QoS requirement. The central scheduler informs the base stations to exchange the data according to the remaining data streams in the calculation.

Figure 7:
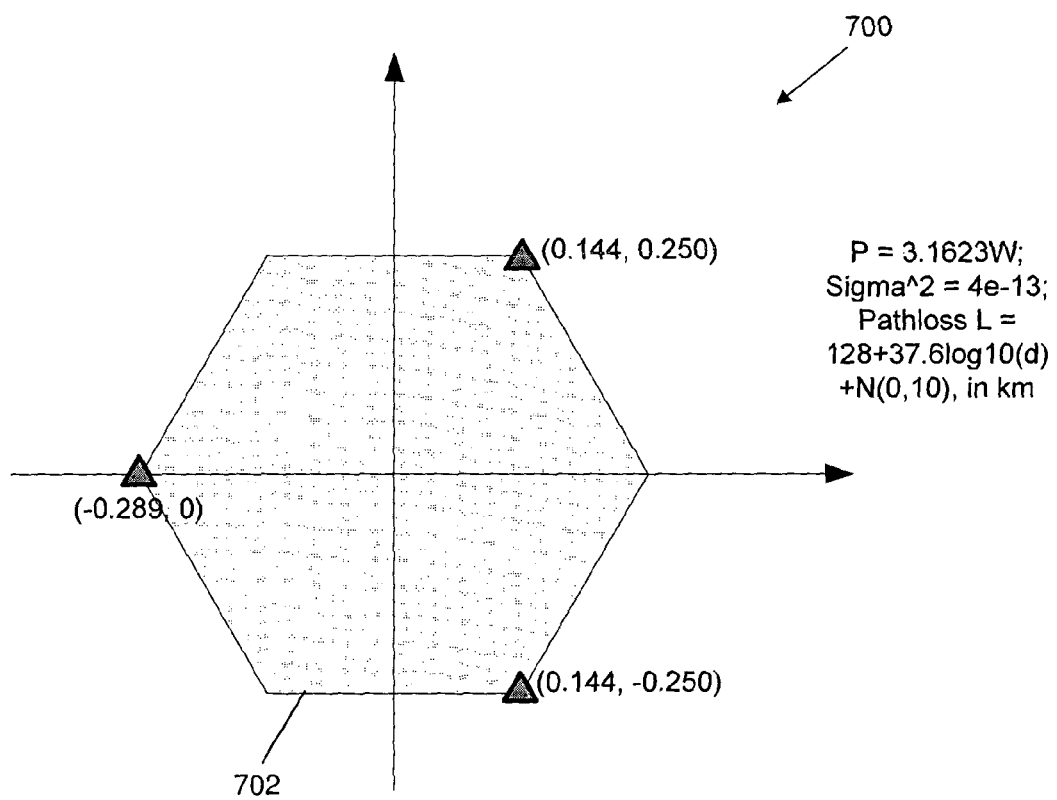
FIG. 7 shows a simulation setup according to one embodiment.

FIG. 7 shows a simulation setup 700. The cell radius is about 288.67 m. The neighboring base station distance is about 0.5 km. Each BS has 2 antennas, and each mobile station has 1 antenna. The power at each BS is about 30 dBm (1 W), and the antenna gain is about 5 dB. The SINR requirement $\gamma_i$ is about 20 dB. The noise variance (including noise figure) at each MS is about $4 \times 10^{-13}$ W. The path loss model in dB is 128+37.6·log$_{10}$(d), where d is in km. The lognormal shadowing is about 10 dB.

50 user locations are chosen randomly in the hexagon 702. 100 channel realizations are performed for each user location. For each channel realization, 3 base stations cooperate is considered to transmit to 3 mobile stations.

Figure 8A:
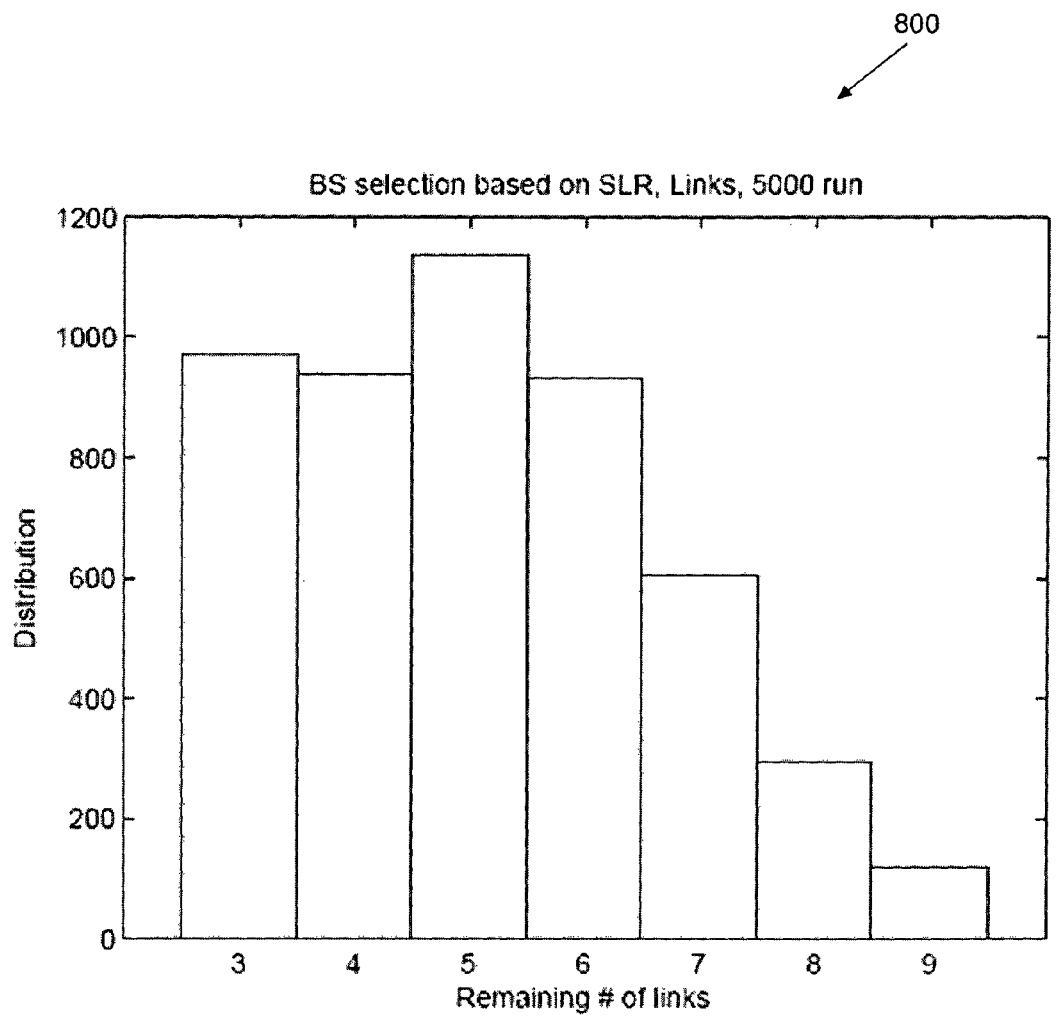
FIG. 8a shows a graph illustrating a distribution for different numbers of remaining data links for a signal to leakage (SLR) based clustering method according to one embodiment.

FIG. 8*a* shows a graph 800 illustrating a distribution of different numbers of remaining data links for a signal to leakage (SLR) based clustering method. A simulation of 5000 runs is carried out for the SLR based clustering method. Graph 800 shows that there are about 980 occurrences of 3 remaining data links, about 940 occurrences of 4 remaining data links, about 1150 occurrences of 5 remaining data links, about 940 occurrences of 6 remaining data links, about 600 occurrences of 7 remaining data links, about 300 occurrences of 8 remaining data links, and about 100 occurrences of 9 remaining data links.

Figure 8B:
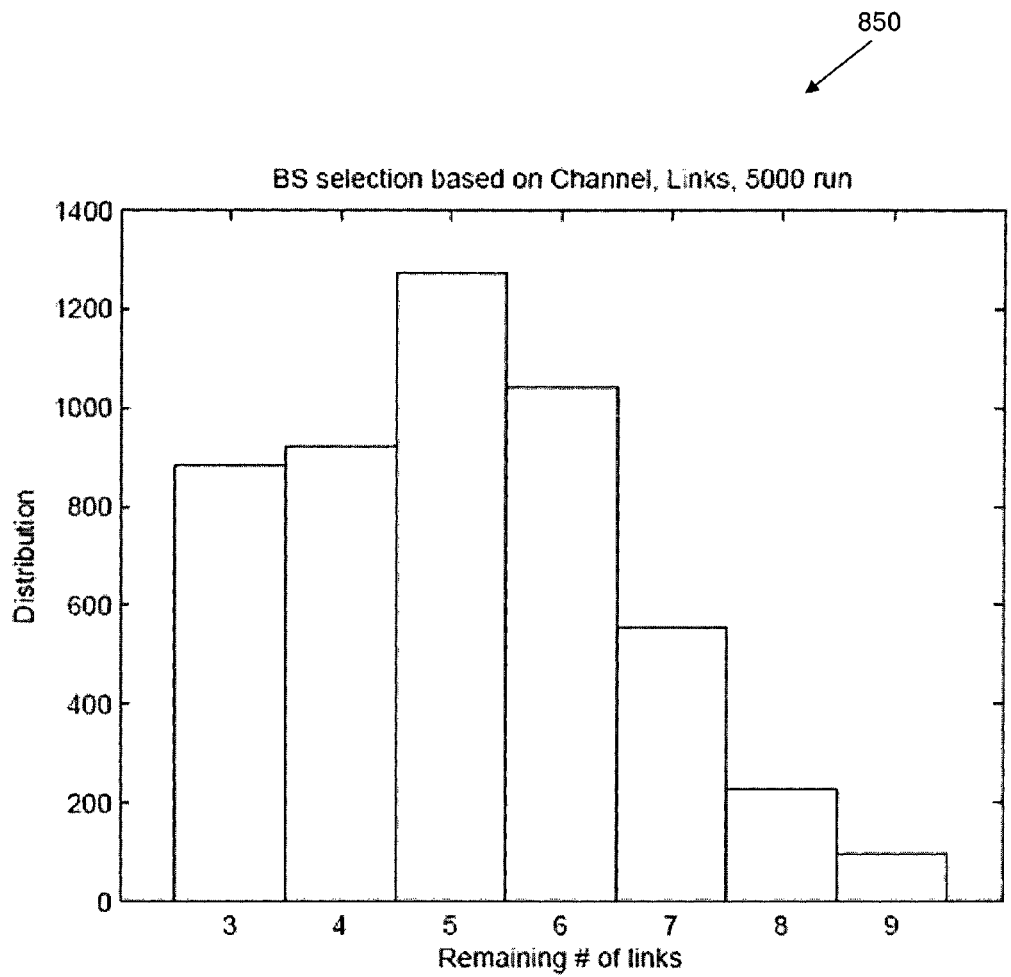
FIG. 8b shows a graph illustrating a distribution for different numbers of remaining data links for a channel strength based clustering method according to one embodiment.

FIG. 8*b* shows a graph 850 illustrating a distribution of different numbers of remaining data links for a channel strength based clustering method. A simulation of 5000 runs is carried out for the channel strength based clustering method. Graph 850 shows that there are about 880 occurrences of 3 remaining data links, about 920 occurrences of 4 remaining data links, about 1280 occurrences of 5 remaining data links, about 1040 occurrences of 6 remaining data links, about 560 occurrences of 7 remaining data links, about 230 occurrences of 8 remaining data links, and about 90 occurrences of 9 remaining data links.

Figure 9A:
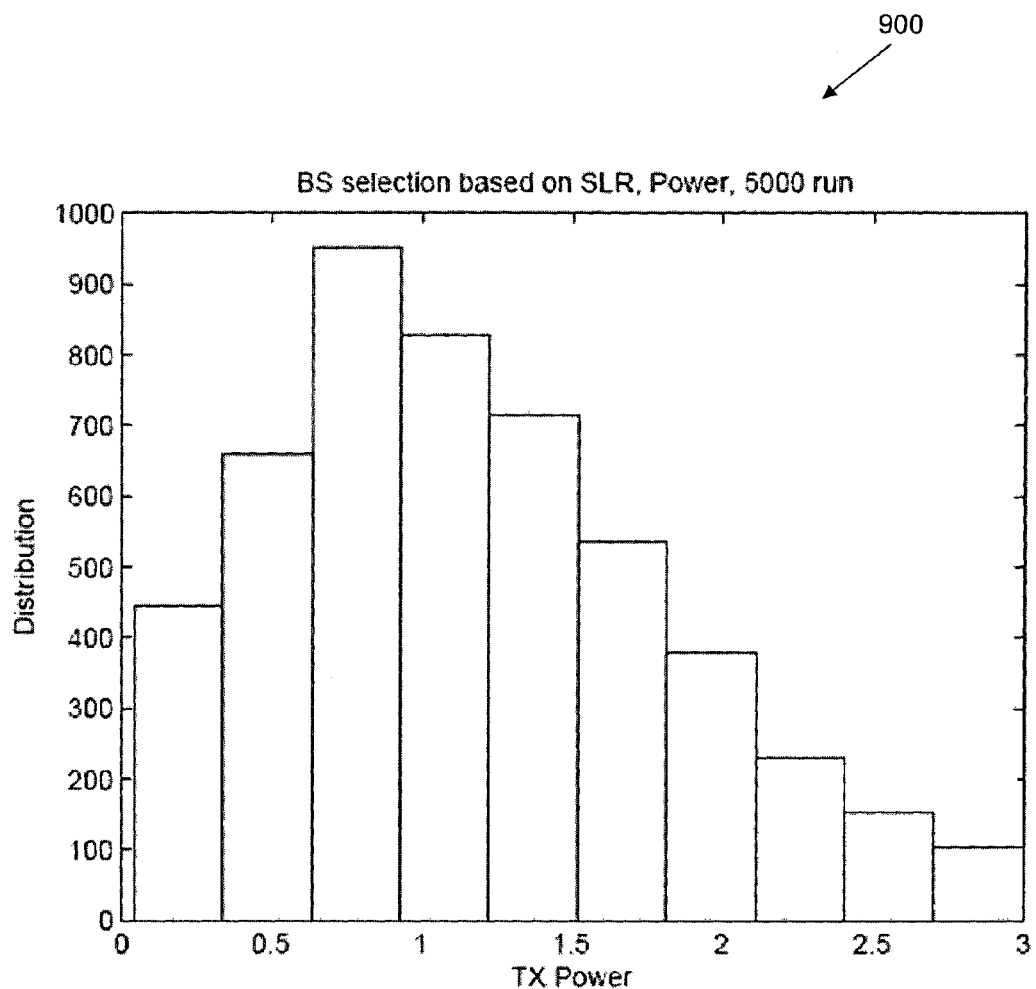
FIG. 9a shows a graph illustrating a distribution for different transmit powers for a signal to leakage (SLR) based clustering method according to one embodiment.

FIG. 9*a* shows a graph 900 illustrating a distribution of different transmit powers of the base stations for a signal to leakage (SLR) based clustering method. A simulation of 5000 runs is carried out for the SLR based clustering method. Graph 900 shows that there are about 660 occurrences of 0.5 transmit power, about 810 occurrences of 1.0 transmit power, about 510 occurrences of 1.5 transmit power, about 470 occurrences of 2.0 transmit power, and about 220 occurrences of 2.5 transmit power. The values of the transmit power on the x-axis of graph 900 are obtained using a linear scale and are normalized with respect to a transmission power at 46 dBm (i.e. 39.81 Watt).

Figure 9B:
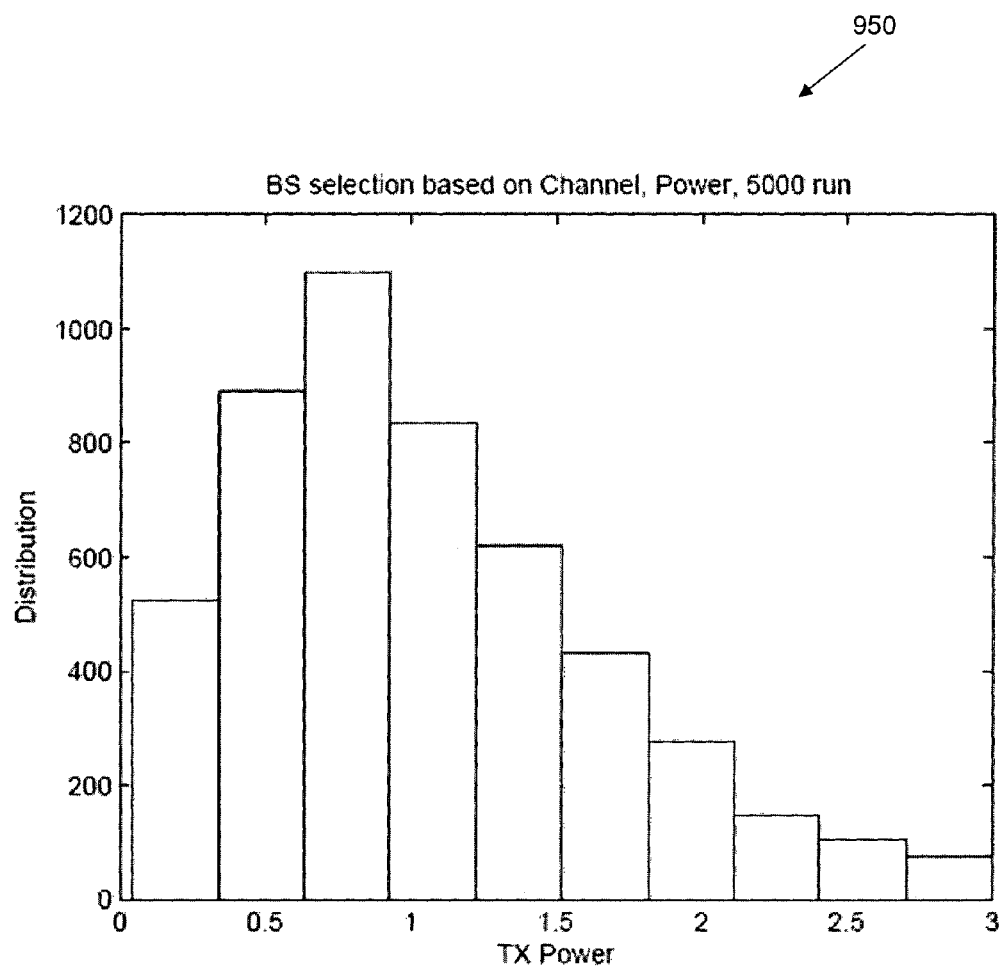
FIG. 9b shows a graph illustrating a distribution for different transmit powers for a channel strength based clustering method according to one embodiment.

FIG. 9*b* shows a graph 950 illustrating a distribution of different transmit powers of the base stations for a channel strength based clustering method. A simulation of 5000 runs is carried out for the channel strength based clustering method. Graph 950 shows that there are about 900 occurrences of 0.5 transmit power, about 850 occurrences of 1.0 transmit power, about 450 occurrences of 1.5 transmit power, about 300 occurrences of 2.0 transmit power, and about 100 occurrences of 2.5 transmit power. The values of the transmit power on the x-axis of graph 950 are obtained using a linear scale and are normalized with respect to a transmission power at 46 dBm (i.e. 39.81 Watt).

The methods as described above may provide a scheme for determining the cooperation base stations subject to the given signal to interference-plus-noise ratio (SINR) requirements in cellular downlinks with an objective to minimize the backhaul data exchange between cooperating base stations.

The methods as described above may choose the clustering base stations that minimize the cooperating costs for a given set of mobile stations subject to the given SINR (QoS) requirements in the cellular downlink.

The methods as described above may be dynamic clustering methods for base station cooperation. The methods as described above may include an interference coordination mechanism. The methods as described above can maximize the sparsity of the data allocation matrix, determine the beamforming vectors, the power allocation at e-NodeBs (eNBs) and cooperating eNBs at the same time, and optimize the transmit power and beamforming vectors at the same time. Further, the methods as described above may require no user data in the process of determining the clustering sets, beamforming vectors and transmit power at eNBs.

While embodiments of the invention have been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A method of transmitting data between a plurality of base stations and a plurality of mobile stations, the method comprising:
   ranking data links between the plurality of base stations and the plurality of mobile stations according to a quality criterion; and
   selecting a subset of data links for transmitting the data between the plurality of base stations and the plurality of mobile stations such that a predetermined requirement is satisfied, wherein the selected subset comprises data links having rankings comprising the highest ranking or both the highest ranking and one or more rankings selected in a descending order from the highest ranking;
   wherein selecting the subset of data links comprises:
      assigning a predetermined value to power of the data link having the lowest ranking of the parameter and determining if the predetermined requirement is satisfied;
      if it is determined that the predetermined requirement is satisfied, assigning the predetermined value to power of the data link having the next lowest ranking and further determining if the predetermined requirement is satisfied; and
      if it is determined that the predetermined requirement is not satisfied, selecting the remaining data links for transmitting the data between the plurality of base stations and the plurality of mobile stations,
   wherein the predetermined requirement comprises a signal to interference-plus-noise ratio constraint requirement and a power constraint requirement, and wherein the predetermined requirement is satisfied when a signal to interference-plus-noise ratio of each mobile station is greater than or equal to a predefined signal to interference-plus-noise ratio of the mobile station and when a sum of the power allocated to the data links at each base station is smaller than or equal to a predefined total power constraint of the base station.

2. The method of claim 1, wherein the predetermined value is zero.

3. The method of claim 1, wherein ranking the data links according to a quality criterion comprises:
   calculating a value of the quality criterion for each data link; and
   ranking the data links according to the values of the quality criterion.

4. The method of claim 1, wherein the quality criterion comprises a signal-to-leakage ratio of the data link.

5. The method of claim 1, wherein the quality criterion comprises a channel strength of the data link.

6. The method of claim 1, further comprising:
determining if the predetermined requirement is satisfied based on information of the data links between the plurality of base stations and the plurality of mobile stations before the data links are ranked according to a quality criterion.

7. The method of claim 6, wherein the information of the data links comprises power allocated to each data link.

8. The method of claim 6, wherein the information of the data links further comprises a beamforming vector of each data link.

* * * * *